Figure 1:
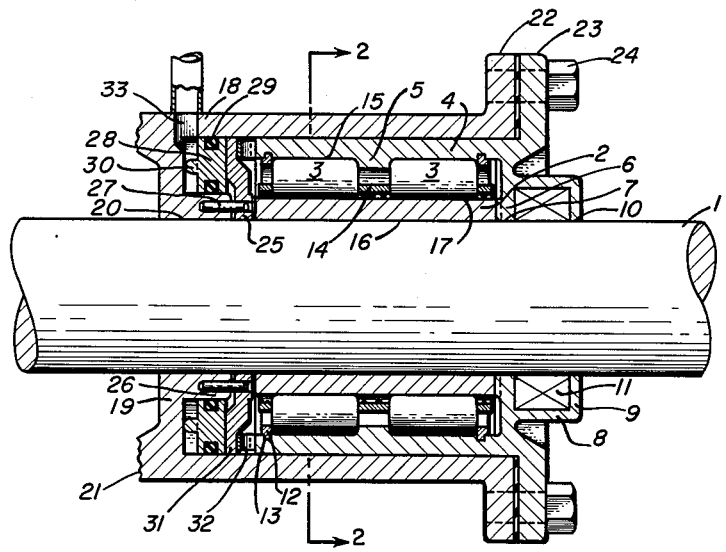

May 30, 1961     G. BANERIAN     2,986,430
COMPOSITE BEARING

Filed Feb. 3, 1956

INVENTOR.
GORDON BANERIAN

BY D. Gordon Angus
ATTORNEY.

United States Patent Office 2,986,430
Patented May 30, 1961

2,986,430
COMPOSITE BEARING
Gordon Banerian, Sacramento, Calif., assignor to Aerojet-General Corporation, Azusa, Calif., a corporation of Ohio
Filed Feb. 3, 1956, Ser. No. 563,305
8 Claims. (Cl. 308—35)

This invention relates in general to bearings and more particularly has reference to a composite bearing for a high-speed shaft.

The invention is susceptible of use in conjunction with longitudinally positioned shafts and may be modified in form to seat a vertical shaft or function as an end-thrust bearing, with the same advantages which will be described.

The composite bearing device forming the subject matter of this invention consists broadly of a sliding or plain bearing having a high-speed shaft journaled therein, incorporated in an anti-friction bearing. A clutch is provided for selective alternate operation of one or the other types of bearings, according to the relative efficiency of each at varying speeds of the shaft. Upon initiating rotation of the shaft and operating the same at low speeds, the anti-friction bearing is employed and then as the speed of the shaft increases, the sliding bearing is made operative instead.

The efficiency of a sliding bearing is dependent upon maintenance of an adequate film of lubricant between the contact surfaces. This film is broken down when a shaft stands at rest as the lubricant is pressed out. This results in the metallic surfaces of the shaft and bearing coming in direct contact. When rotation of a shaft is commenced in a sliding bearing without a sufficient sustaining film of lubricant, destructive scoring and abrading may result, particularly under heavy loading.

An anti-friction bearing functions most efficiently under conditions of starting and rotation of a shaft at low speeds, requiring less energy to overcome torque and less lubrication, as there is a minimum of surface contact. This type of bearing has definite inherent limitations, which are well known in the art, and does not have the capacity, as does a sliding bearing, to operate so effectively with a shaft rotating at high speed.

In the practice of the present invention, an anti-friction element forming a part of the composite bearing is employed upon beginning rotation of a shaft, as has been mentioned, and while a sufficient sustaining film of lubricant is built up between the shaft and a sliding element, at speeds which do not tax its capacity. The load is transferred to a sliding element as the speed of rotation of the shaft increases, before such capacity is reached.

The disadvantages which have attended the use of either an anti-friction or sliding bearing, solely, are thus overcome and utilization made of the highly desirable characteristics of each.

It has been previously sought to combine anti-friction and sliding bearings. The two types have been employed conjunctively, and a sliding bearing incorporated in an anti-friction bearing as a precaution against failure of the latter, being adapted to function only in the event of such a contingency. The concept, however, has not previously been reduced to practical application. For example, the prior combination anti-friction and sliding bearings have embodied a multiplicity of moving parts actuated by creation of an oil wedge as a function of the speed of the shaft. It is apparent that in such centrifical devices there can be no flexibility of operation, as actuation is limited to a specific speed of the shaft coupled with the particular configuration of the moveable parts. Also these types of bearings have been capable of concomitant operation, a disadvantage sought to be overcome by this invention, as has been explained.

An object of this invention is to provide a composite bearing device for a high-speed shaft, embodying anti-friction and slidable elements capable of operating alternately in order to utilize the desirable characteristics of each as opposed to the other, and eliminate the inherent disadvantages heretofore attending use of either solely.

Another object of this invention is to provide a composite bearing device embodying an anti-friction element adapted to function upon initiating rotation of a high-speed shaft and during the period the same operates at low speed, and a slidable element for alternate functioning before the speed of rotation of the shaft reaches the capacity of the anti-friction element.

Still another object of this invention is to provide a composite bearing for a high-speed shaft journaled in a sliding element which latter is allowed to rotate with the shaft in engagement with an anti-friction element when rotation of the shaft is commenced and while the same is operated at low speeds, in which the sliding element is adapted to be locked against rotation so that the shaft will rotate therein by engagement of a fluid pressure operated friction clutch therewith when the speed of the shaft reaches a predetermined value.

A further object of this invention is to provide a composite bearing for a high-speed vertical shaft embodying an anti-friction element for operation upon starting and as the speed of the shaft increases within the capacity thereof and a sliding element for alternate use before the speed of the shaft reaches the capacity of the anti-friction element.

With these and other objects in view which may be incident to the improvements provided by this invention, there is shown in the accompanying drawings and detailed description, an embodiment of the invention, together with a modification thereof, for carrying the same into practical effect in its useful applications. It will be understood, however, that the invention is in nowise limited to the precise details of construction, arrangement and design shown and described as it is apparent that many changes and variations may be made therein without departing from the spirit of the invention or exceeding the scope of the appended claims.

Figure 2:
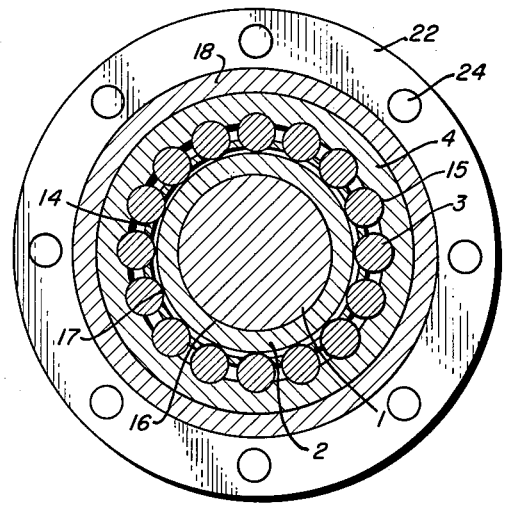

In the drawings forming a part of this sepcification:
Figure 1 is a side sectional view of a form of the composite bearing forming the subject matter of this invention, showing a high-speed shaft journaled therein;
Figure 2 is a sectional view taken on line 2—2 of Figure 1, looking in the direction of the arrows.

Referring more particularly by numerals to the drawings in which the same and similar elements are designated by like symbols of reference throughout, and more especially to Figures 1 and 2, there is shown a high speed shaft 1 journaled in a sliding or plain bearing element 2 which is journaled in an anti-friction bearing element 3. While cylindrical roller type anti-friction members are shown, it will be apparent that spherical ball type members may be readily substituted with appropriate changes in design.

The roller bearing members are adapted to rotate in contact with an outer cylindrical housing member 4 and with the outer periphery of the sliding element 2.

The housing member 4 is formed with a central integral inner peripheral ring 5 for spacing the roller members longitudinally, and an end closure 6 having a central aperture 7 for accommodating the shaft. A chamber is formed on the outer face of the closure 6 by an integrally formed outwardly extending annular rim 8 having an inwardly extending lip 9 formed thereon for accommodating the shaft 1, as indicated at 10. It is intended that the chamber so formed be packed with a suitable sealing material 11 to prevent leakage of lubricant.

The roller bearing members 3 separated by the spacer 5 are prevented from spreading longitudinally by annular stops 12 fitted in inner peripheral grooves provided in the cylindrical housing member 4 as indicated at 13. The roller bearings 3 are held in position by a conventional carriage 14, and adapted to function in correspondingly configured seats provided in the inner periphery of the housing member 4 as indicated at 15.

It will be observed from the foregoing that the element 2 provides a plain or sliding bearing for the shaft 1, with respect to the inner periphery thereof, as indicated at 16, and is journaled in an anti-friction bearing as seen at 17. A composite bearing is thus provided. It is to be pointed out, however, that one or the other bearing elements is adapted to function alternately, and not both simultaneously, as has been the instance in the prior art; also that the element 2 forms an integral part of both types of bearings eliminating unnecessary parts.

Obviously, as the friction contact between the element 2 and the shaft, as shown at 16, is far greater than that between the element 2 and the rollers 3 indicated at 17, the inertia of the element 2 will not be overcome when rotation of the shaft 1 is initiated. It will therefore normally rotate with the shaft 1, through the motion imparted thereby, as is fixed to or integrally formed on the shaft. There is so provided an anti-friction bearing element. It will be similarly apparent that if the element 2 is locked against rotation with the shaft 1, a sliding bearing element, as indicated at 16, is provided.

The housing member 4 may be supported in any suitable housing, for example, telescoped in a cylindrical housing 18 having an integrally formed closure 19 at one end with a central aperture 20 to accommodate the shaft 1. The housing 18 is shown broken away at 21, it being intended that the same form a part of or be fixed to any desirable type of support.

The other end of the housing 18 may be formed with a radially extending circular lip, and the closure 6 being a part of the housing member 4 at the other end, made detachable by forming the same with an extended peripheral portion 23, adapted to abut and be fastened against the lip 22 on the housing 18 by cap screws 24.

As hereinbefore set forth, the invention includes suitable means for locking the sliding bearing 2 against rotation. This may be accomplished in any desirable manner. For example, there is shown a washer 25 mounted on the shaft 1 in longitudinally slidable relation thereto adjacent an end of the sliding element 2. The housing is formed with an integral inwardly extending collar 26 having pins 27 fixedly seated around the inner rim thereof adapted to fit in corresponding apertures provided in the washer 25, allowing longitudinal sliding of the washer 25 but preventing rotation thereof.

An annular piston 28 is mounted on the collar 26 for sliding thereon. The piston is formed with grooves around the inner and outer peripheries thereof for receiving washers 29 to prevent fluid leakage in or lubricant leakage out of the housing. The piston 28 is also formed with an annular projection 30 around the outer face to space the piston from the inner face of the integral end housing closure 19 so that a compartment is formed for receiving fluid under pressure for a purpose to be explained.

The slidable washer 25 is integrally formed with peripheral collar 31 angularly offset outwardly in relation thereto. The outer periphery of the collar is adapted to slide against the inner periphery of the cylindrical housing 4. A wave spring 32 is interposed between the inner face of the collar and the rim of the housing member 4 to normally maintain the washer 25 out of contact with the rim of the sliding element 2, and the outer face of the collar 31 against the inner face of the piston 28. An aperture 33 communicating with the compartment formed by the end housing closure and outer face of the annular piston 28 is provided in the housing 18 to admit fluid under pressure therein. For this purpose a fluid conduit may be attached to the aperture 33.

It will be apparent that when fluid under pressure is introduced in the said compartment, the piston 28 will be forced to slide inwardly on the inner end closure collar 26, and against the outer face of the collar 31 formed on the washer 30, to compress the wave spring 32, and force the inner face of the washer 25 in frictional engagement against the rim of the sliding element 2. When the fluid pressure is released, the spring 32 will act to disengage the washer from the sliding element. A friction clutch is thus provided.

The sliding element 2 will rotate with the shaft 1 on the rollers 3 as has been explained when the washer 25 is held out of contact with the rim thereof by the wave spring 32. When the spring is compressed through the force exerted by the introduction of fluid under pressure, the reverse will obtain and the sliding element locked against rotary movement so that the shaft 1 will rotate therein and the impetus withdrawn for further operation of the rollers 3.

The operation of the invention will be clearly understood from the foregoing. Under conditions of starting, and operation of the shaft 1 at low speeds within the capacity of the anti-friction elements 3, the piston 28 and washer 25 are maintained in the position indicated in Figure 1 by the action of the wave spring 32, with the inner face of the slidable washer out of contact with the rim of the sliding element 2. In this position, the sliding element 2 will be allowed to rotate with the shaft 1 on the rollers 3 and the advantages attending use of an anti-friction bearing realized.

No provision has been shown or described for lubricating the device as it is contemplated that any of a variety of conventional modes may be employed, under pressure or otherwise, by introduction through conduits provided in the shaft or housing. The only limitation on the method which may be used is that sufficient lubricant be available during the period of operation of the anti-friction element, to create a sustaining film thereof between the contact surfaces of the sliding element and the shaft. The relative rotation of the shaft carrying the sliding element, with the members making up the anti-friction element, with consequent shifting of pressure, will permit and induce the formation and maintenance of such a film.

It is intended to discontinue operation of the anti-friction elements 3 before the speed of the shaft reaches the capacity thereof by locking of the sliding element 2 against rotation in the manner which has been described. The fluid pressure operated clutch may be actuated through the use of any of a number of conventional devices, not shown, for example, by an automatic control when the speed of rotation of the shaft reaches a predetermined value, or a manually actuated control may be employed if deemed desirable.

The invention as shown and described herein is in nowise limited to such illustration and description but is susceptible to variations and modifications and limited only as defined in the following claims.

I claim:

1. A composite bearing comprising a sliding element having a high-speed shaft journaled therein, an anti-friction element in which the sliding element may rotate with the shaft and a fluid actuated clutch for engaging the sliding element to stop movement of said sliding and anti-friction elements, said clutch being operated by fluid pressure generated by means independent of the elements of the bearing.

2. A composite bearing comprising a sliding element having a high-speed shaft journaled therein, an anti-friction element in which the sliding element may rotate with the shaft, a clutch normally held out of engagement with the sliding element and fluid pressure actuating means independent of the bearing for operating the clutch to engage the sliding element in frictional contact to stop further movement of the sliding and anti-friction elements.

3. A composite bearing comprising a housing, a sliding bearing element having a high-speed shaft journaled therein, an anti-friction element mounted in said housing, the sliding bearing element being mounted in said anti-friction element and which may rotate with the shaft, a washer mounted on the shaft adjacent the sliding member and slidable longitudinally with respect to the shaft but fixed against rotation therewith by said housing, spring means tending to maintain the washer out of contact with the sliding element, and fluid pressure means within said housing to force the washer against the sliding element at times to stop rotation thereof with rotation of the shaft therein, said fluid pressure means being operated independently of the bearing elements.

4. A composite bearing comprising a housing, a sliding bearing element mounted in said housing and having a high-speed shaft journaled therein, an anti-friction element mounted in said housing co-axially with the sliding element and in which the sliding element may rotate with the shaft, a washer mounted on the shaft adjacent the sliding member, and slidable longitudinally with respect to the shaft but fixed against rotation therewith by said housing, spring means tending to maintain the washer out of contact with the sliding element, an annular cylinder surrounding said shaft and a fluid pressure controlled annular piston in said cylinder for forcing the washer laterally against the sliding element at times to stop rotation thereof with the rotation of the shaft therein.

5. A clutch device for a composite bearing including separately operative anti-friction and sliding elements, embodying fluid pressure operated means for frictionally engaging the sliding element with the anti-friction element to prevent further movement of either element, said fluid pressure operated means being supplied pressurized fluid by means independent of the bearing.

6. A composite bearing for a high speed rotating shaft comprising, a sliding element arranged in close fitting relationship with the shaft, an anti-friction element arranged in close fitting relationship with said sliding element, means for rotating said sliding element relative to said anti-friction element and in conjunction with the rotations of the shaft, and clutch means controlled by fluid pressure introduced independently of said elements for locking said sliding element and said anti-friction element against further rotation.

7. A composite bearing for a high speed rotating shaft comprising a sliding element in which the shaft may rotate, an anti-friction element in which said sliding element may rotate, means for rotating said sliding element in conjunction with the rotations of the shaft, and fluid pressure actuating means controlled independently of said elements for locking said sliding element and said anti-friction element against further movement.

8. A composite bearing comprising a sliding element having a high-speed shaft journal therein, an anti-friction element in which the sliding element may rotate with the shaft, and means operated by fluid pressure supplied independently of the bearing elements for preventing rotation of the sliding element and the anti-friction element.

References Cited in the file of this patent

UNITED STATES PATENTS

| | | |
|---|---|---|
| 757,115 | Hashor | Apr. 12, 1904 |
| 1,121,083 | De Ferranti | Dec. 15, 1914 |
| 1,596,090 | Florell | Aug. 17, 1926 |
| 1,946,652 | Wallgren | Feb. 13, 1934 |

FOREIGN PATENTS

| | | |
|---|---|---|
| 59,805 | Sweden | Nov. 3, 1925 |